US012747633B2

(12) United States Patent
Grimes et al.

(10) Patent No.: US 12,747,633 B2
(45) Date of Patent: Sep. 29, 2026

(54) DETACHABLE LADDER AND WALL MOUNT

(71) Applicant: Lippert Components, Inc., Elkhart, IN (US)

(72) Inventors: Marc Grimes, Nappanee, IN (US); Andrew Murray, Granger, IN (US); Dominic Layne, South Bend, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 1144 days.

(21) Appl. No.: 17/717,640

(22) Filed: Apr. 11, 2022

(65) Prior Publication Data

US 2022/0325580 A1 Oct. 13, 2022

Related U.S. Application Data

(60) Provisional application No. 63/172,741, filed on Apr. 9, 2021.

(51) Int. Cl.
*E06C 5/24* (2006.01)
*E06C 5/36* (2006.01)

(52) U.S. Cl.
CPC . *E06C 5/24* (2013.01); *E06C 5/36* (2013.01)

(58) Field of Classification Search
CPC ..... E06C 5/24; E06C 5/00; E06C 5/36; E06C 1/34; E06C 1/36; E06C 7/505; E06C 7/50; E06C 7/06; E06C 7/48; E06C 7/484; E06C 7/486; E06C 7/488; B60R 3/00; B60R 3/005; B60R 3/007; B60R 9/0423; B60R 9/0485
See application file for complete search history.

(56) References Cited

U.S. PATENT DOCUMENTS 1,018,877 A * 2/1912 Chickering ............... E06C 7/48
24/527
2,448,716 A * 9/1948 Hurd ....................... E06C 7/488
182/206

(Continued)

FOREIGN PATENT DOCUMENTS

AU 2015215915 A1 * 9/2015
GB 2 428 642 1/2009

OTHER PUBLICATIONS

Telescoping Ladder, Ohuhu Upgraded . . . , https://www.amazon.com/Ohuhu-Telescopic-Extension-Extendable-Telescoping/dp/B01LAHCOQ4/?tag=rvwebnetwork-20, website pages, 11 pages, printed out on Apr. 11, 2022 (origination date unknown).

*Primary Examiner* — David E Martinez
(74) *Attorney, Agent, or Firm* — NIXON & VANDERHYE P.C.

(57) ABSTRACT

A ladder system is cooperable with a surface such as a recreational vehicle rear wall or the like and includes a wall mount securable to the surface, a ladder with a plurality of rungs, a securing bracket connected to one of the plurality of rungs. The wall mount includes a flat back section engageable with the surface, an engagement portion connected to the flat back section, and first and second openings between the engagement portion and the flat back section, where the first and second openings are spaced from each other. The securing bracket of the ladder system includes a pair of grips that are sized to fit over the engagement portion of the wall mount in the first and second openings.

21 Claims, 13 Drawing Sheets

(56) References Cited

U.S. PATENT DOCUMENTS

| | | | | | |
|---|---|---|---|---|---|
| 4,257,492 | A * | 3/1981 | Rasada, Jr. | E06C 7/48 | 182/206 |
| 4,482,029 | A | 11/1984 | Prochaska | | |
| 6,044,930 | A * | 4/2000 | Hayman | E06C 1/34 | 182/206 |
| 6,079,684 | A * | 6/2000 | Korth | E06C 7/50 | 248/300 |
| 7,267,197 | B2 * | 9/2007 | Camaioni | E06C 7/08 | 182/178.4 |
| 7,721,849 | B2 * | 5/2010 | Graffy | E06C 5/02 | 182/127 |
| 8,708,102 | B2 * | 4/2014 | Mickens | E06C 1/125 | 182/195 |
| 9,914,396 | B1 | 3/2018 | Scott | | |
| 9,945,179 | B1 | 4/2018 | Joldersma | | |
| 10,030,446 | B2 | 7/2018 | Badillo | | |
| 10,822,875 | B1 | 11/2020 | Hailey | | |
| 10,858,887 | B2 | 12/2020 | Orscheln et al. | | |
| 11,440,480 | B2 * | 9/2022 | Dickman | B60R 9/0485 | |
| 2006/0272896 | A1 * | 12/2006 | Rajewski | E06C 1/36 | 182/127 |
| 2011/0109120 | A1 | 5/2011 | Bonerb | | |
| 2011/0158783 | A1 * | 6/2011 | Carlson | E06C 7/484 | 414/800 |
| 2017/0356245 | A1 * | 12/2017 | Surdo | E06C 7/48 | |
| 2018/0002982 | A1 * | 1/2018 | Dressel | E06C 7/16 | |
| 2019/0061629 | A1 * | 2/2019 | Gemme | E06C 7/182 | |
| 2020/0399099 | A1 | 12/2020 | Tanimoto et al. | | |

* cited by examiner

DETACHABLE LADDER AND WALL MOUNT

CROSS-REFERENCES TO RELATED APPLICATIONS

This application claims the benefit of U.S. Provisional Patent Application No. 63/172,741, filed Apr. 9, 2021, the entire content of which is herein incorporated by reference.

STATEMENT REGARDING FEDERALLY SPONSORED RESEARCH OR DEVELOPMENT (NOT APPLICABLE)

BACKGROUND

The invention relates to a ladder system for recreational vehicles (RVs) and the like and, more particularly, to an easily attachable and detachable ladder system that provides for improved access to a vehicle roof.

Ladders mounted to the back or side of an RV such as a motor home or the like are known for the purpose of a user accessing the roof of the vehicle. Many RV ladders are fixed in place on a wall of the vehicle and are not meant to be removed. A permanently affixed ladder, however, is constantly subjected to environmental conditions and can be unsightly.

Multi-purpose telescoping ladders are known for easy storage by a user, but are generally not designed to be fixed to any structure.

Other ladders for use on vehicles are mountable to a wall and removable, but generally have a simple mounting member or hook connected to the side rails of the ladder. Still other vehicle-mounted ladders have a mounting point that is limited to the top end of the ladder.

SUMMARY

The ladder system of the described embodiments is detachably mounted to the vehicle preferably at an intermediate rung of the ladder by a suitable wall-mounted bracket. In some embodiments, the ladder includes a telescoping ladder frame.

The wall-mounted bracket is generally meant to be mounted on the rear door of a vehicle such as a toy hauler, but could be mounted to any suitable wall of the vehicle, including front and side walls. The wall mount includes a metal or plastic engagement portion or is configured with openings used for securing the grips or hooks of a ladder securing bracket. In some embodiments, the engagement portion is held in place through apertures in the wall-mounted bracket and secured at the ends by end caps built into the bracket. The openings are formed integral with the wall mount. In some embodiments, the engagement portion is a bar formed as an integral part of the wall mount.

The ladder securing bracket may include a flat mounting portion that is secured to the underside of a ladder rung by fasteners. Two grips or hooks extend rearwardly from the flat mounting portion and are designed to engage the engagement portion or the openings of the wall mount. The engagement portion may be a bar, plate, flange, or other surface that is suitable to be grasped, hooked, or otherwise engaged by the grips. In some embodiments, the two grips or hooks are individually attached to the ladder by a mounting portion that is secured to each end of the ladder rung around the side rails.

In an exemplary embodiment, a ladder system is cooperable with a surface to which a wall mount is securable. The wall mount includes a flat back section engageable with the surface, an engagement portion connected to the flat back section, and first and second openings between the engagement portion and the flat back section, where the first and second openings are spaced from each other. The ladder system also includes a ladder with a plurality of rungs, and a securing bracket connected to one of the plurality of rungs. The securing bracket has a pair of grips that are sized to fit over the engagement portion of the wall mount in the first and second openings.

The wall mount may include a central bumper portion with a lateral channel therethrough with the engagement portion extending through the lateral channel, and first and second end caps connected to opposite ends of the engagement portion. In this context, the engagement portion may be a bar that is sized such that the first and second end caps are spaced from the central bumper portion, and the pair of grips may be spaced apart such that the grips respectively engage the bar between the first end cap and the central bumper portion and between the second end cap and the central bumper portion. The length of the openings between the end caps and the central bumper may be similar to or slightly larger than the length of the grips to reduce lateral movement or sliding of the ladder when engaging the wall mount. The flat back section, the central bumper portion and the first and second end caps may be formed of injection molded plastic, rubber or metal. The bar may be cylindrical, and the grips may define at least part-circular sections that are sized to fit over the cylindrical bar. In some embodiments, the grips may be semi-circular.

The ladder may include a plurality of telescoping sections.

The securing bracket may include a flat mounting portion secured to an underside of the one of the plurality of rungs. The grips may be monolithic with the flat mounting portion and extend from the one of the plurality of rungs rearward toward the surface to which the wall mount is securable.

The one of the plurality of rungs to which the securing bracket is connected may be at an intermediate position of the ladder relative to others of the plurality of rungs.

The ladder may include side rails to which the plurality of rungs are connected between, and a width of the wall mount may be narrower than a distance between the side rails.

In another exemplary embodiment, a wall mount is securable to a surface and is cooperable with a securing bracket connected to one of a plurality of rungs on a ladder. The securing bracket includes a pair of grips. The wall mount includes an engagement portion, and a back section integral with the engagement portion and defining openings between the engagement portion and the back section. The wall mount is formed of a one-piece injection molded material, and the openings are spaced apart corresponding to a space between the grips. The wall mount may have a thickness defined by the space between the engagement portion and the back section. The engagement portion may extend across a width of the wall mount.

In yet another exemplary embodiment, a ladder system cooperable with a surface includes a ladder with a plurality of rungs, and a securing bracket connected to one of the plurality of rungs, where the securing bracket includes a pair of grips that are configured to engage a wall mount engagement portion. A wall mount may be securable to the surface and may include openings that are configured to receive the pair of grips. The openings may be sized substantially corresponding to a length of each of the pair of grips. The ladder may include side rails, and the rungs may extend between the side rails, where a width of the wall mount substantially corresponds to a distance between the side rails.

BRIEF DESCRIPTION OF THE DRAWINGS

These and other aspects and advantages will be described in detail with reference to the accompanying drawings, in which.

DETAILED DESCRIPTION

Figure 1:
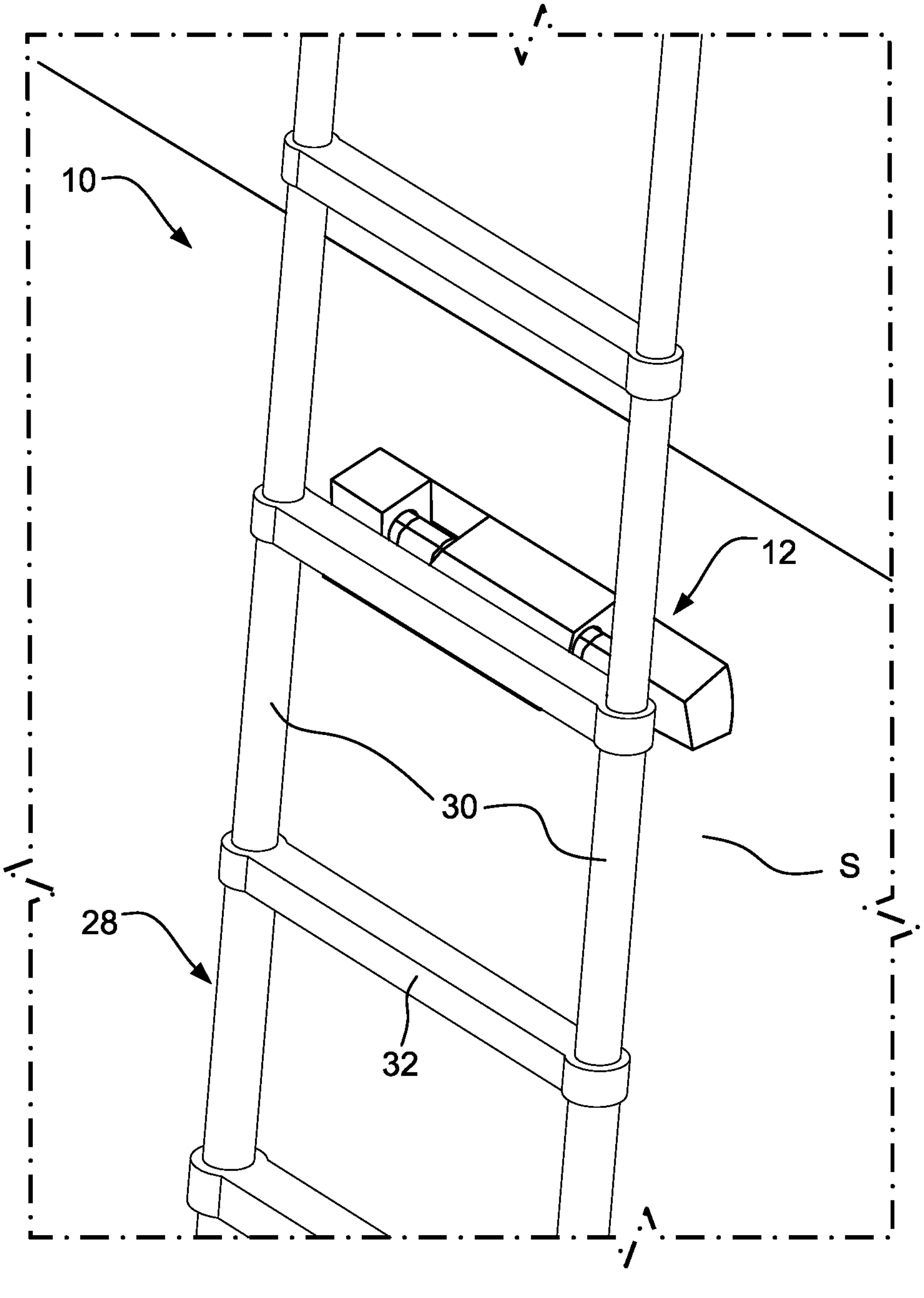
FIG. 1 is a perspective view of the ladder system according to the described embodiments.
Figure 2:
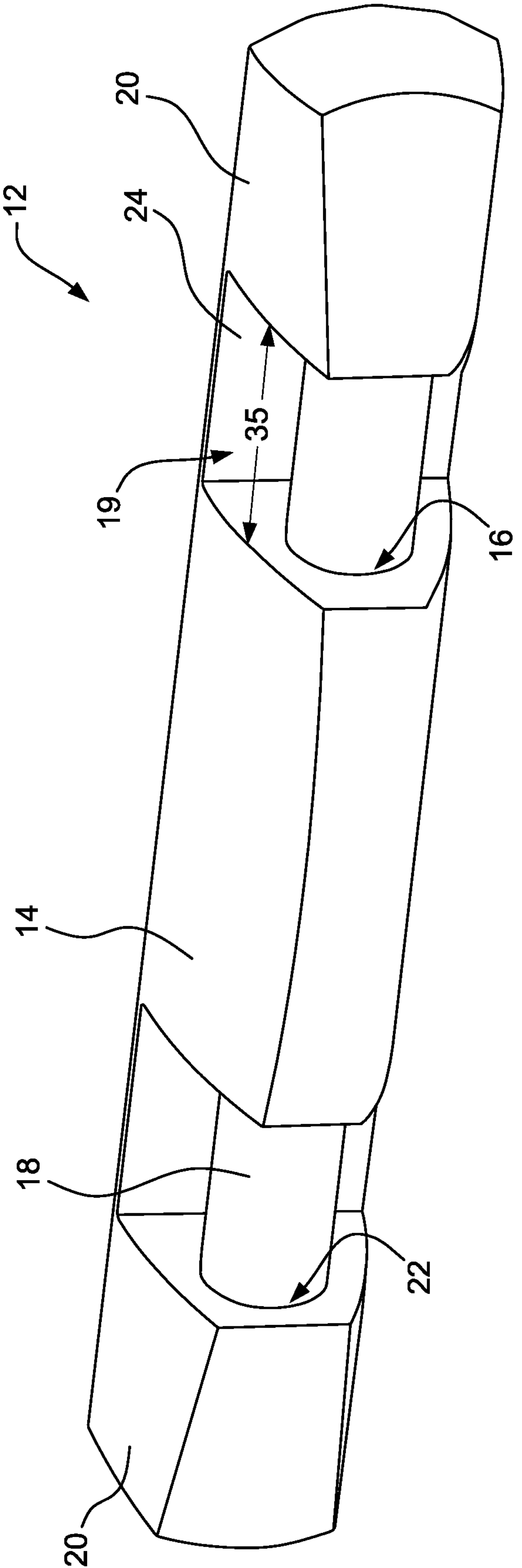
FIG. 2 is a close-up view of the wall mount.

With reference to FIG. 1, a ladder system 10 is cooperable with a surface S such as a back door or side wall of an RV. The ladder system 10 includes a wall mount 12 securable to the surface S. With reference to FIG. 2, the wall mount 12 includes a central bumper portion 14 with a lateral channel 16 therethrough. An engagement portion 18, shown as a bar in this embodiment, extends through the lateral channel 16. First and second end caps 20 are connected to opposite ends of the bar 18. The end caps 20 include channels 22 therein that receive distal ends of the bar 18. As shown, the bar 18 is sized such that the first and second end caps 20 are spaced from the central bumper portion 14.

Figure 3:
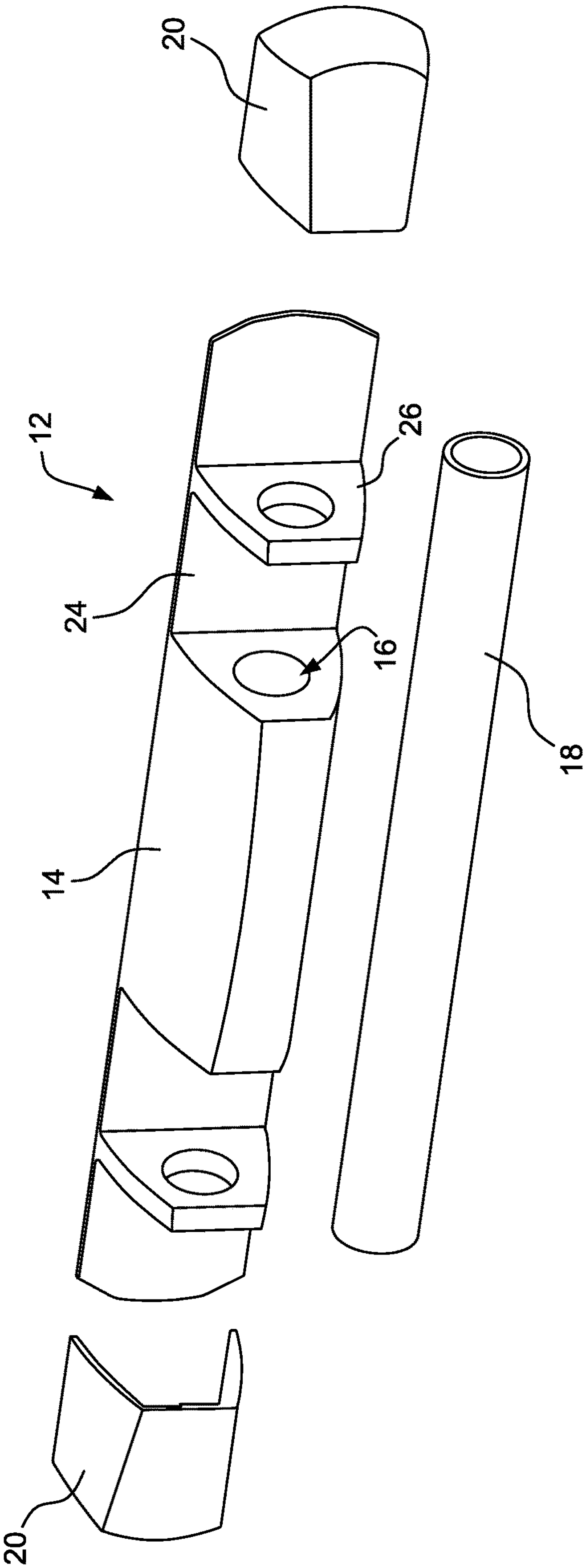
FIG. 3 is an exploded view of the wall mount.

FIG. 3 is an exploded view of the wall mount 12. The wall mount 12 is also provided with a flat back section 24 that is securable to the surface S. The flat back section 24 can be secured to the surface S by any suitable method such as fasteners or a strong adhesive or the like. In some embodiments, the central bumper portion 14 and the first and second end caps 20 are integral with the flat back section 24. Alternatively, the first and second end caps 20 may be attached to end cap tabs 26 and the flat back section 24 via welding or the like. The flat back section 24, the central bumper portion 14 and the first and second end caps 20 may be formed of injection molded plastic, rubber or metal. The wall mount 12 defines openings 19 (FIG. 2) between the engagement portion 18 and the flat back section 24.

Figure 4:
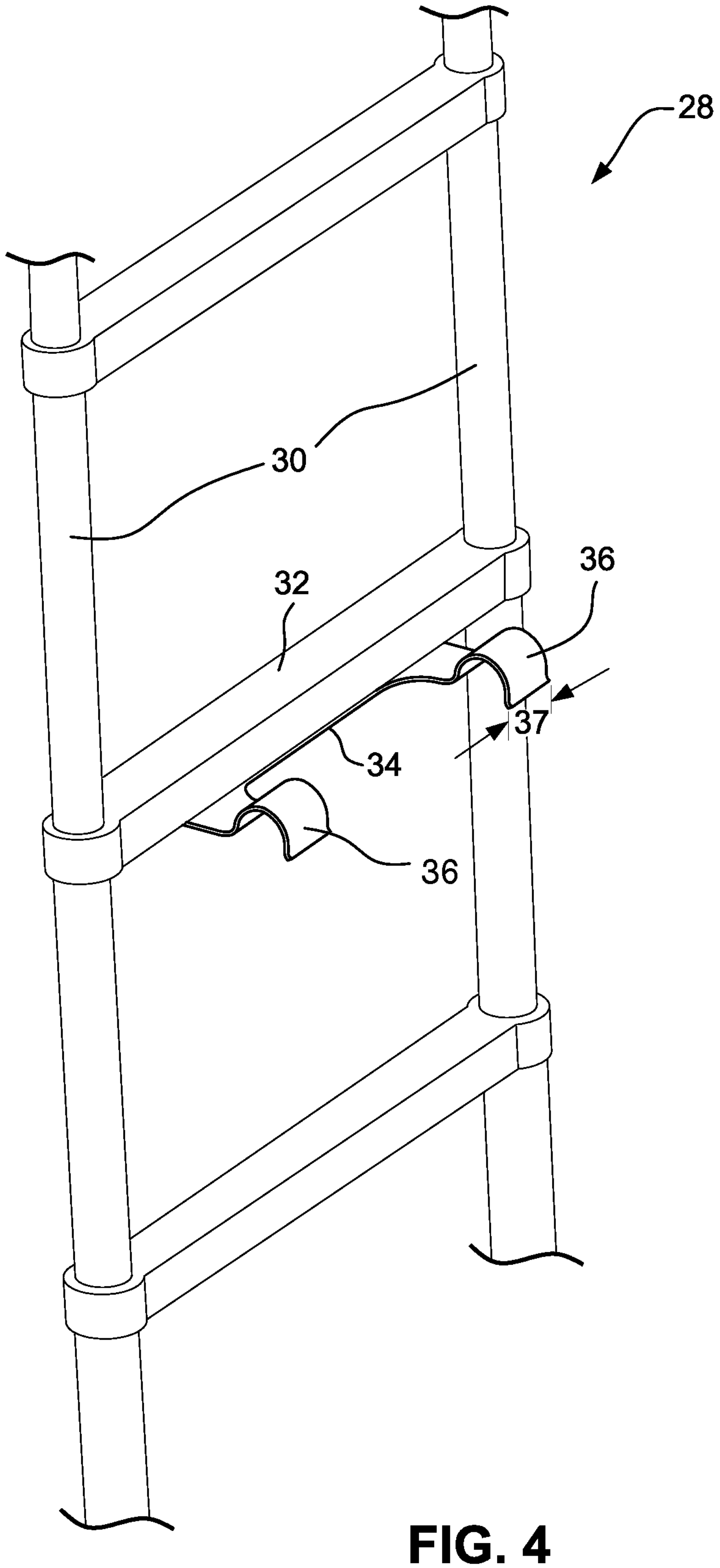
FIGS. 4 and 5 show the ladder and securing bracket that engages the wall mount.

With reference to FIG. 4, the ladder system 10 also includes a ladder 28 with side rails 30 and a plurality of rungs 32 secured between the side rails 30. In some embodiments, the side rails 30 are constructed of a plurality of telescoping tubes or the like. Telescoping ladders of this type are known, and further details thereof will not be described.

Figure 5:
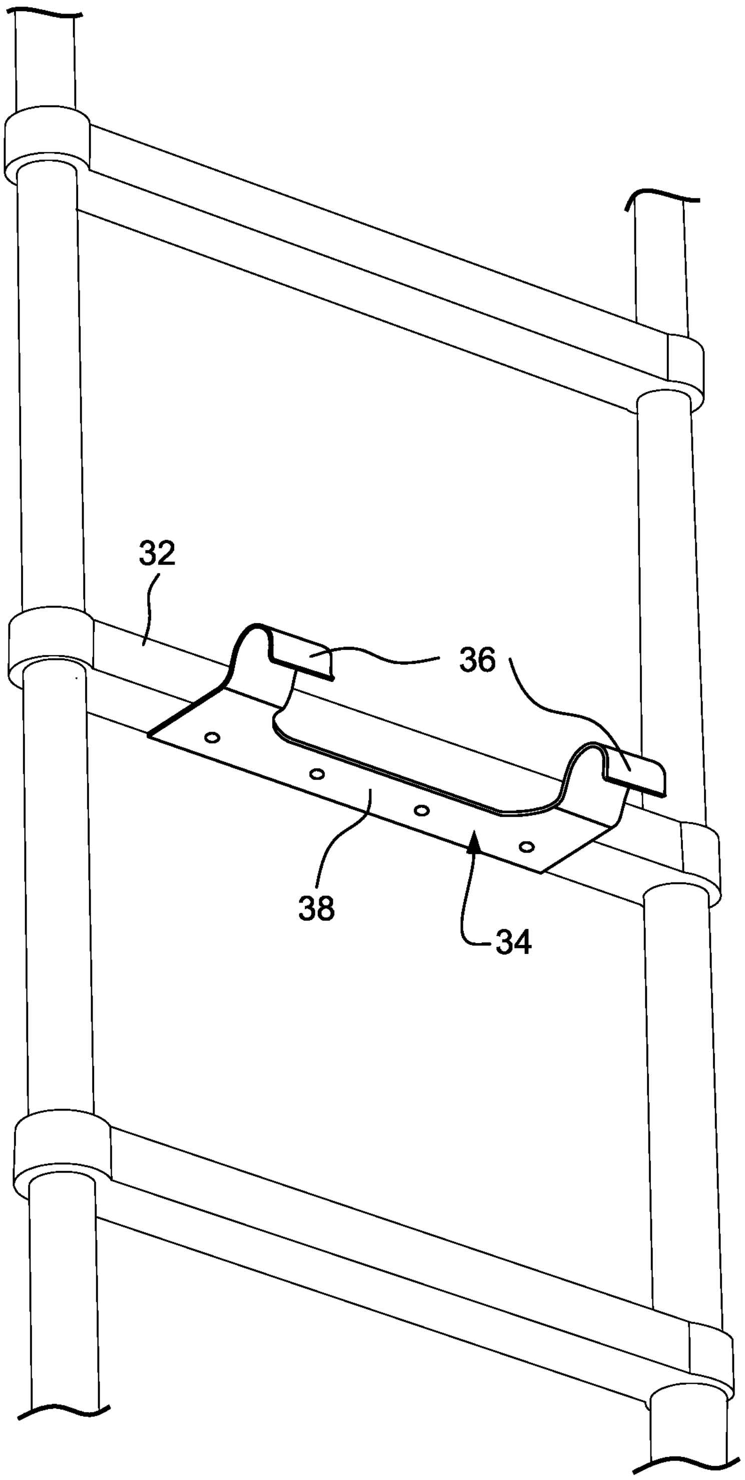

With reference to FIGS. 4 and 5, a securing bracket 34 is connected to one of the rungs 32. The securing bracket 34 includes a pair of grips 36 that are sized to fit over the engagement portion 18 of the wall mount 12, through the openings 19 (FIG. 2). The grips 36 are spaced apart such that the grips 36 respectively engage the engagement portion 18 in the spaces between the first and second end caps 20 and the central bumper portion 14, respectively. See FIG. 6. In some embodiments, the length or distance 35 (FIG. 2) between the end caps 20 and central bumper 14 may substantially correspond to (i.e., may be similar to or slightly larger than) the length 37 (FIG. 4) of the grips 36 to reduce lateral movement or sliding of the grips when engaging the wall mount.

In some embodiments, the engagement portion 18 is cylindrical, and the grips 36 define at least part-circular sections or semi-circular sections that are sized to fit over the cylindrical engagement portion or bar 18. The part- or semi-circular grips 36 are configured to interact with the cylindrical engagement portion 18 of the wall mount 12 and work with gravity to secure the ladder 28 in place. The part- or semi-circular shape also allows for pivoting to adjust the angle of the ladder 28 relative to the surface S depending on the terrain and ground-engagement of the bottom of the ladder 28.

Figure 7:
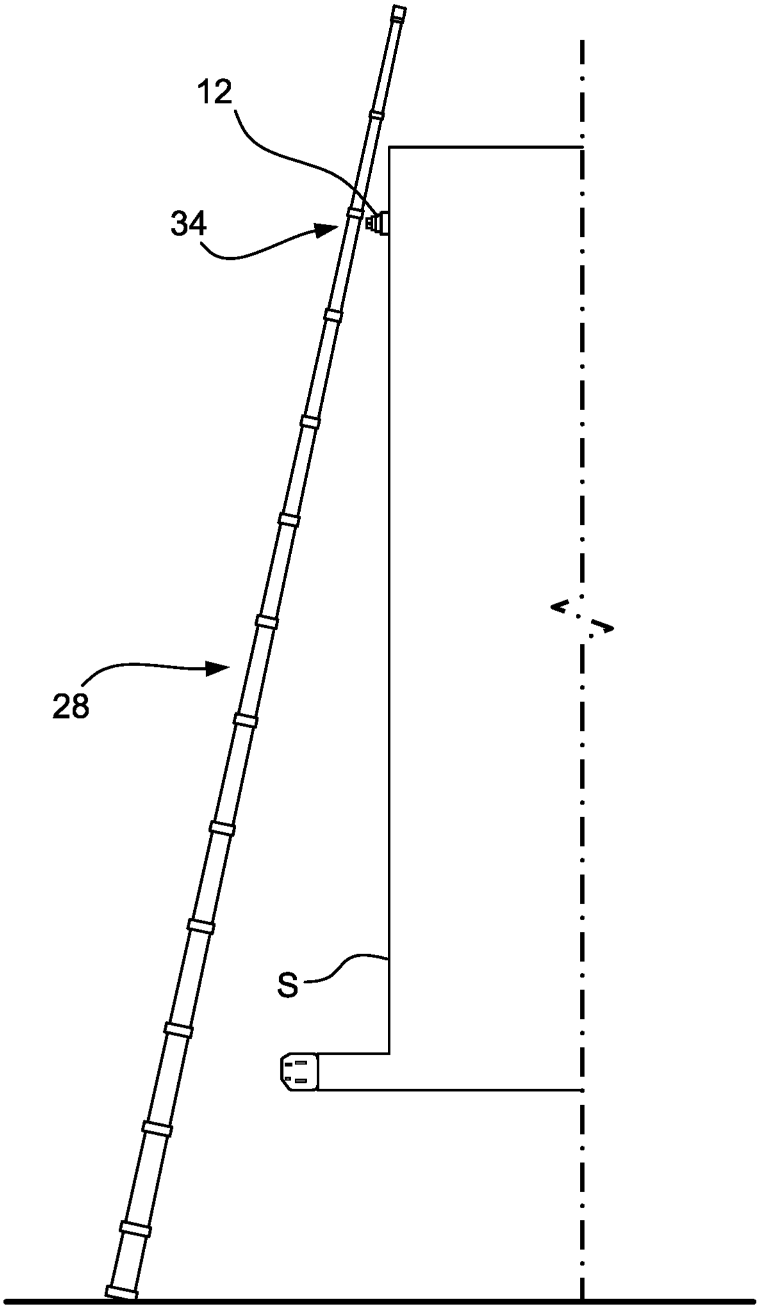
FIG. 7 is a side view of the ladder system showing the connection to an intermediate rung on the ladder.

As most clearly shown in FIG. 5, the securing bracket 34 includes a flat mounting portion 38 that is secured to an underside of the ladder rung 32 via suitable connectors or the like. The grips 36 are preferably monolithic with the flat mounting portion 38 and extend from the rung 32 rearward toward the surface S to which the wall mount 12 is securable. As shown in FIG. 7, the rung 32 to which the securing bracket 34 is connected may be at an intermediate position of the ladder 28 relative to others of the plurality of rungs 32. In this way, portions of the ladder 28 extend above the point at which the ladder engages the wall mount 12. Moreover, the placement of the mounting system at an intermediate portion of the ladder makes installation and removal easier for the user.

Figure 6:
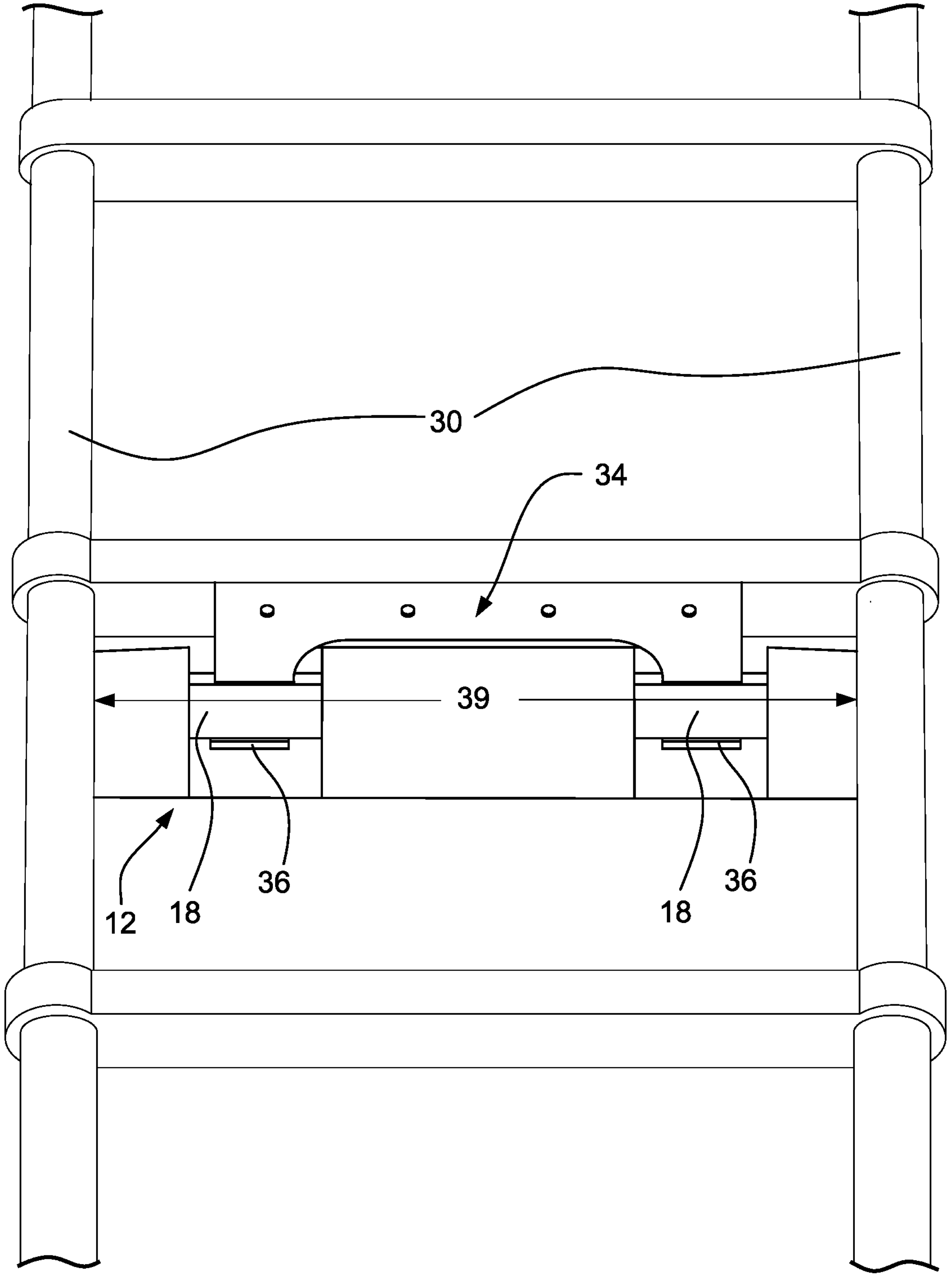
FIG. 6 shows the ladder and securing bracket secured on the wall mount.

As shown in FIG. 6, a width 39 of the wall mount 12 may be narrower than a distance between the side rails 30. As such, the securing bracket 34 and the wall mount 12 are discrete and do not get in the way of the user as the user is climbing the ladder. In some embodiments, the width 39 of the wall mount 12 may substantially correspond to (i.e., similar to or slightly narrower than) the distance between the side rails 30 to fit within the space between the side rails to reduce lateral movement or sliding of the ladder 28 when installed onto the wall mount 12.

The construction of the wall mount 12 accommodates for the size of the grips 36 of the ladder securing bracket 34 and also creates a wall between the grips 36 and the surface S to prevent damage or scratches to the surface S. The end caps 20 and the central bumper portion 14 of the wall mount 12 create guides for receiving the grips 36 and may abut the inner surfaces of the ladder side rails 30 for added securement and safety of the ladder while in use.

FIGS. 8-12 show an alternative embodiment of the ladder system. In this embodiment, the ladder system 110 similarly includes a wall mount 112, a ladder 128, and a securing bracket 134 connected to the ladder 128 and engageable with the wall mount 112.

Figure 9:
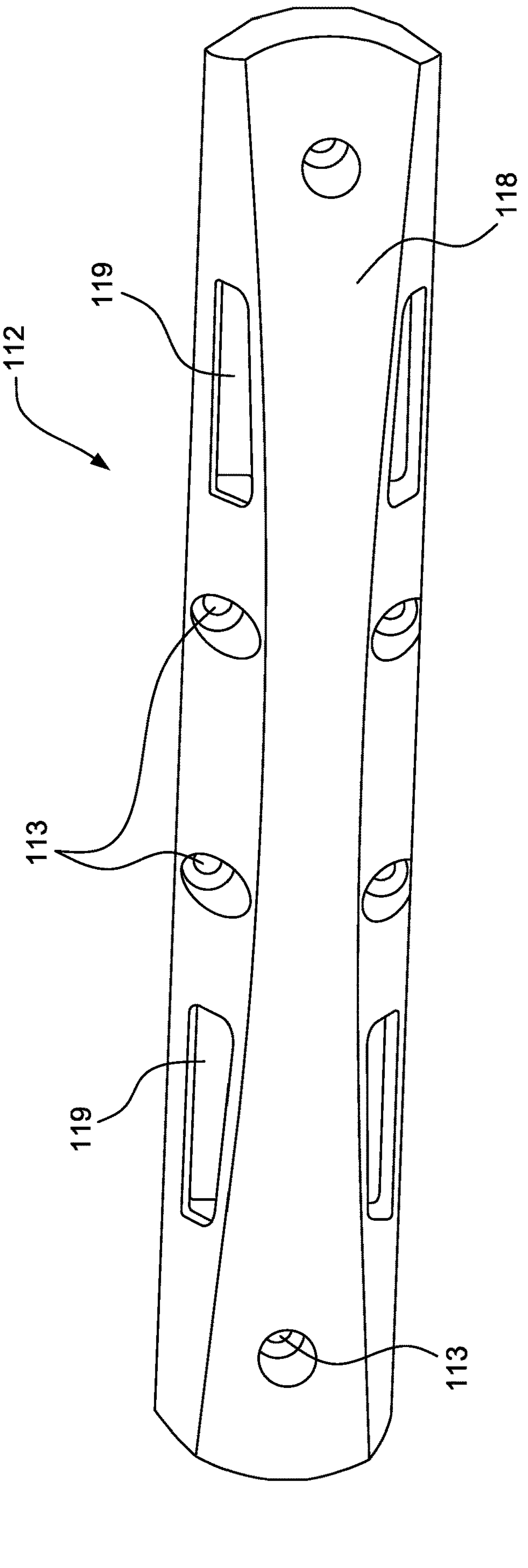
FIG. 9 is a front view of the wall mount in the embodiment shown in FIG. 8.
Figure 10:
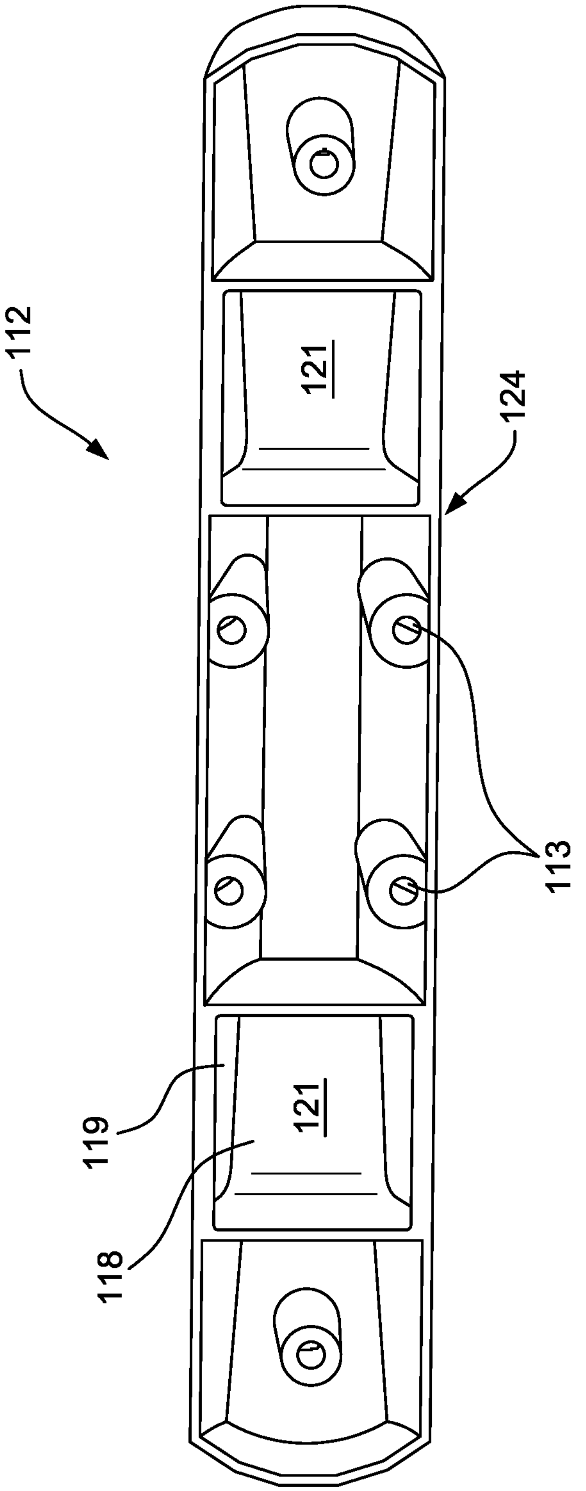
FIG. 10 is a rear view of the wall mount.

With reference to FIGS. 9 and 10, the wall mount 112 is in the form of a one-piece injection molded nylon or similar material. The wall mount 112 includes a plurality of apertures 113 for securing the wall mount 112 to the surface S with suitable fasteners. The wall mount 112 includes a front section or engagement portion 118 integrated with a back section 124 and including openings 119 between the engagement portion 118 and the back section 124. The wall mount 112 has a thickness defined by the space between the engagement portion 118 and the back section 124. The engagement portion 118 extends across a width of the wall mount 112 as shown in FIG. 9.

As shown in FIG. 10, the back section 124 includes apertures 121 (e.g., square apertures in FIG. 10) that delimit the openings 119 in the wall mount 112. The openings 119 are spaced apart from each other in a manner similar to the spaces between the first and second end caps 20 and the central bumper portion 14 in the first embodiment.

The ladder 128 with side rails 130 and a plurality of rungs 132 secured between the side rails 130 is similar to the ladder 28 from the first embodiment. The side rails 130 may be constructed of a plurality of telescoping tubes or the like.

Figure 11:
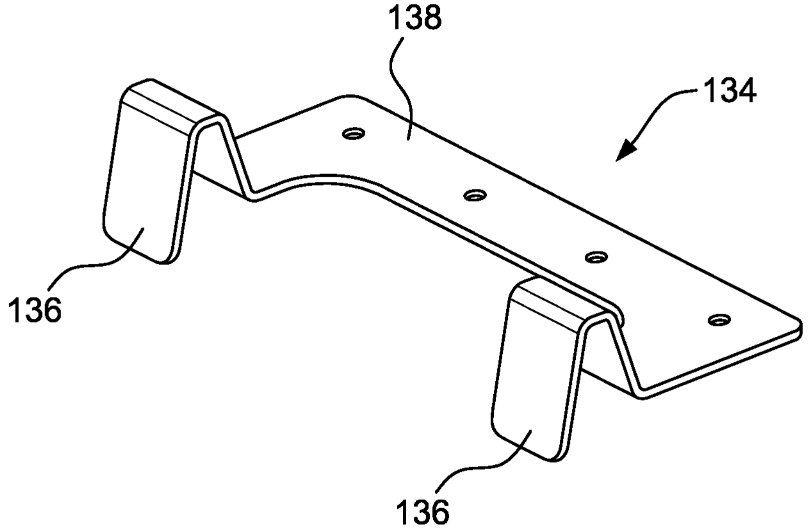
FIG. 11 is a perspective view of a securing bracket for the embodiment shown in FIG. 8.

With reference to FIG. 11, the securing bracket 134 is connectable to one of the rungs 132 of the ladder 128. The securing bracket 134 includes a pair of grips or hooks 136 that are sized to fit in the openings 119 in the wall mount 112. That is, the grips or hooks 136 are spaced apart such that the grips or hooks 136 respectively engage the front section or engagement portion 118 of the wall mount 112 via the openings 119. In some embodiments, the length of the openings 119 may be similar to or slightly larger than the length of the grips 136 to reduce lateral movement or sliding of the grips when engaging the wall mount 112.

The securing bracket 134 includes a flat mounting portion 138 that is secured to an underside of the ladder rung 132 via suitable connectors or the like. The grips or hooks 136 are preferably monolithic with the flat mounting portion 138 and extend from the rung 132 rearward toward the surface S to which the wall mount 112 is securable.

Figure 12:
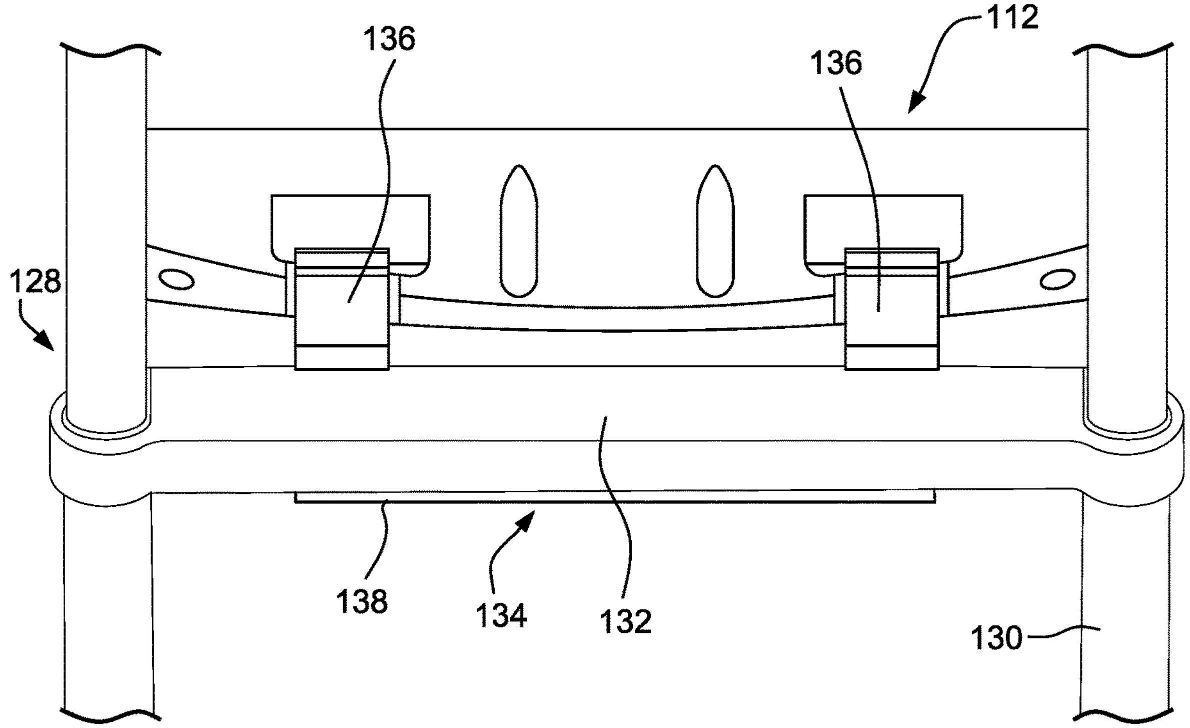
FIG. 12 shows the ladder and securing bracket secured on the wall mount.

FIG. 12 shows the ladder 128 and securing bracket 134 secured on the wall mount 112. The grips or hooks 136 are configured to allow for some pivoting relative to the wall mount. The grips or hooks 136 can be readily engaged in the openings 119 to facilitate securing the ladder 128 to the wall mount 112. Additionally, openings in the wall mount 112 and the length of the grips or hooks 136 serve to ensure that the grips or hooks 136 are prevented from slipping out of the wall mount openings 119 while the ladder is in use. Moreover, the openings in the wall mount 112 prevent water-retention.

Figure 8:
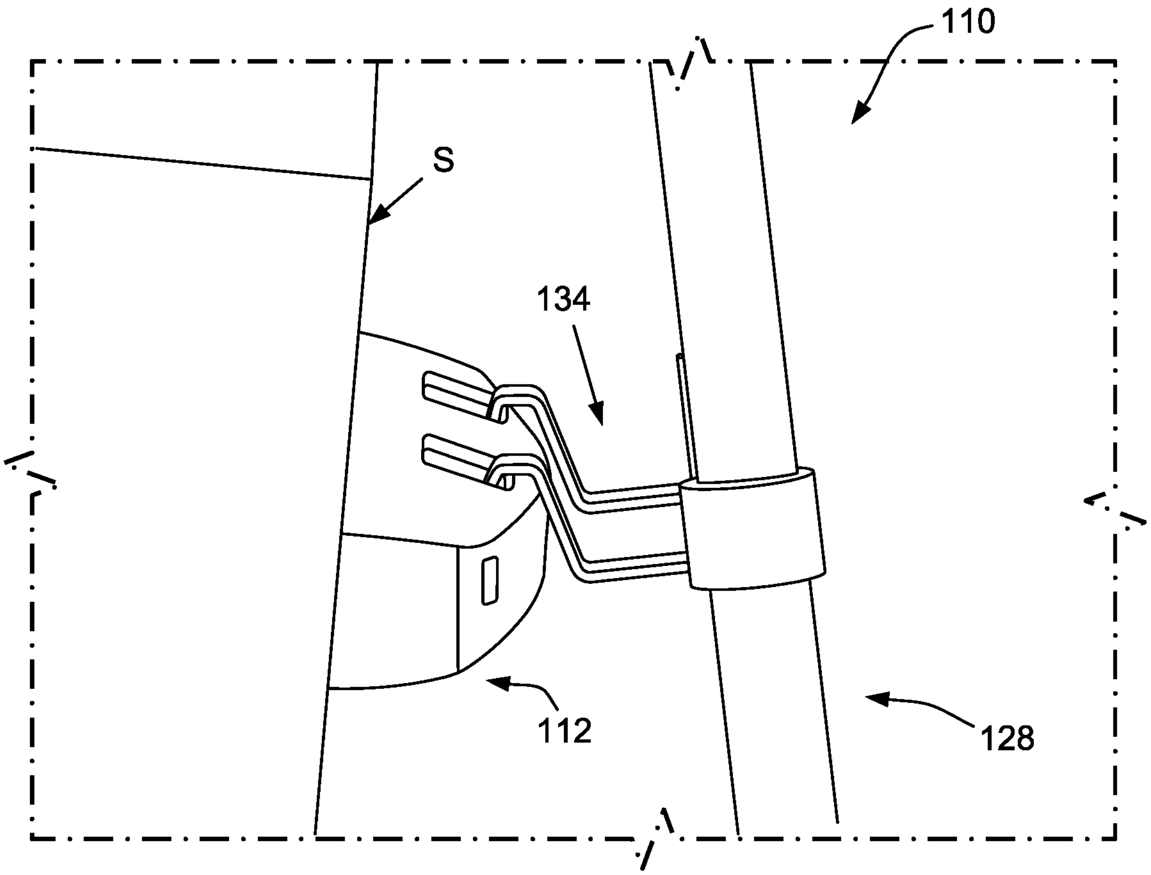
FIG. 8 is a side view of an alternative embodiment.
Figure 13:
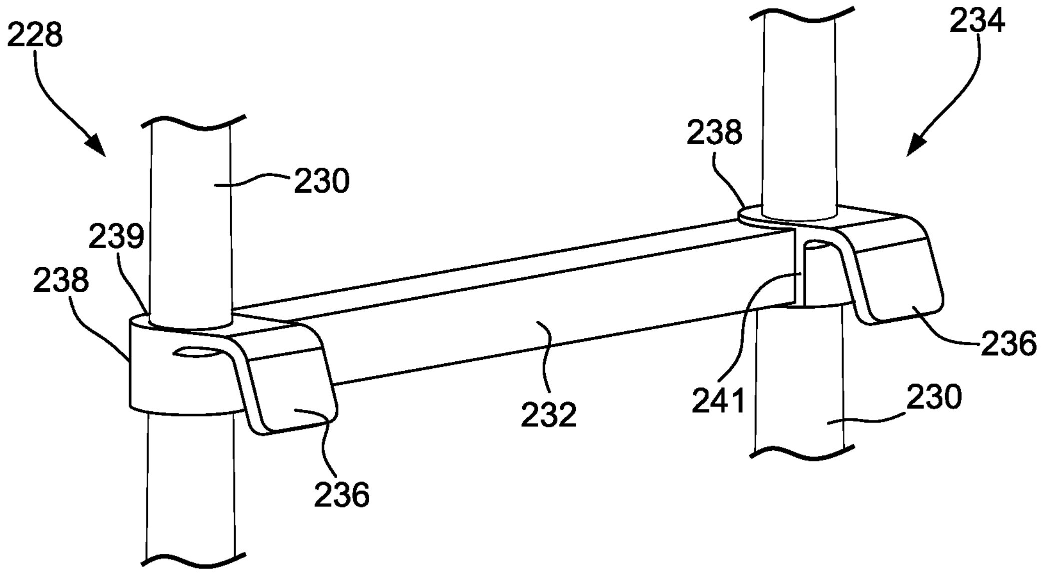
FIG. 13 is a perspective view of another alternative embodiment of the ladder and securing bracket.

FIG. 13 shows an alternative ladder securing bracket 234 for use in a ladder system that is similar to the embodiment of FIG. 8. The securing bracket 234 includes two hollow mounting portions 238 that are connectable to each end of one of the rungs 232 of the ladder 228. The mounting portions 238 have a vertical opening 239 that is shaped to correspond to the shape of the ladder side rails 230. The mounting portions 238 also include a side opening 241 that corresponds to the shape of the ladder rung 232. The vertical openings 239 and the side openings 241 are complementary to the ladder 228 to mitigate movement or shifting between the mounting portions 238 and the ladder 228. The mounting portions 238 of the securing bracket 234 may be injection molded to be integral with the ladder 228 or may include a slit or hinge (not shown) to grasp the ladder rung or clip into place.

The securing bracket 234 includes a pair of grips or hooks 236 that are similar to the securing bracket 134 of the second embodiment. The grips or hooks 236 are similarly sized to fit into openings in a wall mount similar to wall mount 112 of the second embodiment. The wall mount that engages securing bracket 234 may be wider or may have wider openings to accommodate the distance between mounting portions 238.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A ladder system cooperable with a surface, the ladder system comprising:

a wall mount securable to the surface, the wall mount including:

a flat back section engageable with the surface, an engagement portion connected to the flat back section, and first and second openings between the engagement portion and the flat back section, wherein the first and second openings are spaced from each other and include a vertical axis through the wall mount between the flat back section and the engagement portion, wherein each of the first and second openings comprises a defined closed perimeter in a top surface of the wall mount;

a ladder including a plurality of rungs; and a securing bracket connected to one of the plurality of rungs, the securing bracket including a pair of grips that are sized to fit over the engagement portion of the wall mount and into the defined closed perimeter of the first and second openings.

2. A ladder system according to claim 1, wherein the engagement portion comprises a bar, wherein the wall mount comprises a central bumper portion with a lateral channel therethrough with the bar extending through the lateral channel, and first and second end caps connected to opposite ends of the bar, wherein the bar is sized such that the first and second end caps are spaced from the central bumper portion, the pair of grips being spaced apart such that the grips respectively engage the bar between the first end cap and the central bumper portion and between the second end cap and the central bumper portion.

3. A ladder system according to claim 2, wherein the flat back section, the central bumper portion and the first and second end caps are formed of injection molded plastic, rubber or metal.

4. A ladder system according to claim 2, wherein the bar is cylindrical, and wherein the grips define at least part-circular sections that are sized to fit over the cylindrical bar.

5. A ladder system according to claim 4, wherein the grips are semi-circular.

6. A ladder system according to claim 1, wherein the ladder comprises a plurality of telescoping sections.

7. A ladder system according to claim 1, wherein the securing bracket comprises a flat mounting portion secured to an underside of the one of the plurality of rungs.

8. A ladder system according to claim 7, wherein the grips are monolithic with the flat mounting portion and extend from the one of the plurality of rungs rearward toward the surface to which the wall mount is securable.

9. A ladder system according to claim 1, wherein the one of the plurality of rungs to which the securing bracket is connected is at an intermediate position of the ladder relative to others of the plurality of rungs.

10. A ladder system according to claim 1, wherein the ladder includes side rails to which the plurality of rungs are connected between, and wherein a width of the wall mount is narrower than a distance between the side rails.

11. A wall mount securable to a surface and cooperable with a securing bracket connected to one of a plurality of rungs on a ladder, the securing bracket including a pair of grips, the wall mount comprising:

an engagement portion; and a back section integral with the engagement portion and defining openings between the engagement portion and the back section, wherein the wall mount is formed of a one-piece injection molded material, wherein the openings are spaced apart corresponding to a space between the grips, and wherein the openings include a vertical axis through the wall mount between the back section and the engagement portion, wherein each of the first and second openings comprises a defined closed perimeter in a top surface of the wall mount.

12. A wall mount according to claim 11, wherein the wall mount has a thickness defined by the space between the engagement portion and the back section.

13. A wall mount according to claim 12, wherein the engagement portion extends across a width of the wall mount.

14. A ladder system cooperable with a surface, the ladder system comprising:

a wall mount securable to the surface, the wall mount including a flat back section engageable with the surface, an engagement portion connected to the flat back section, and first and second openings between the engagement portion and the flat back section, wherein the first and second openings are spaced from each other;

a ladder including a plurality of rungs extending between a pair of side rails; and a securing bracket connected to one of the plurality of rungs, the securing bracket including a pair of grips that are sized to fit over the engagement portion in the first and second openings, wherein the securing bracket comprises a flat mounting portion secured to an underside of the one of the plurality of rungs.

15. A ladder system according to claim 14, wherein the grips are monolithic with the flat mounting portion and extend from the one of the plurality of rungs rearward toward the surface.

16. A ladder system according to claim 14, wherein the one of the plurality of rungs to which the securing bracket is connected is at an intermediate position of the ladder relative to others of the plurality of rungs.

17. A ladder system according to claim 14, wherein the engagement portion comprises a bar, the wall mount including a central bumper portion with a lateral channel therethrough, the bar extending through the lateral channel, and first and second end caps connected to opposite ends of the bar, wherein the bar is sized such that the first and second end caps are spaced from the central bumper portion, and wherein the grips are spaced apart such that the grips respectively engage the bar between the first end cap and the central bumper portion and between the second end cap and the central bumper portion.

18. A ladder system according to claim 14, wherein the wall mount is formed of a one-piece injection molded material and includes a back section and the openings between the wall mount engagement portion and the back section.

19. A ladder system according to claim 14, wherein the wall mount includes the openings that are configured to receive the pair of grips.

20. A ladder system according to claim 19, wherein the openings are sized substantially corresponding to a length of each of the pair of grips.

21. A ladder system according to claim 19, wherein a width of the wall mount substantially corresponds to a distance between the side rails.

* * * * *